Aug. 1, 1961 T. H. KRUEGER 2,994,464
PUSH BUTTON TAPE DISPENSER

Filed March 25, 1959 4 Sheets-Sheet 1

INVENTOR.
Theodore H. Krueger

BY

Moses, Nolte & Nolte.
ATTORNEYS.

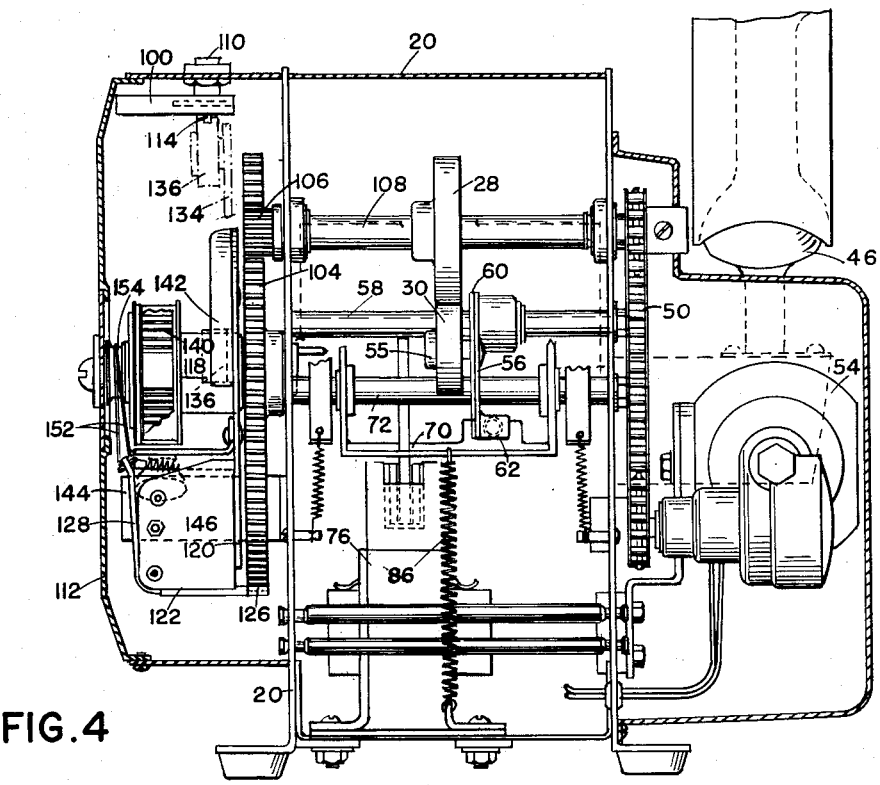
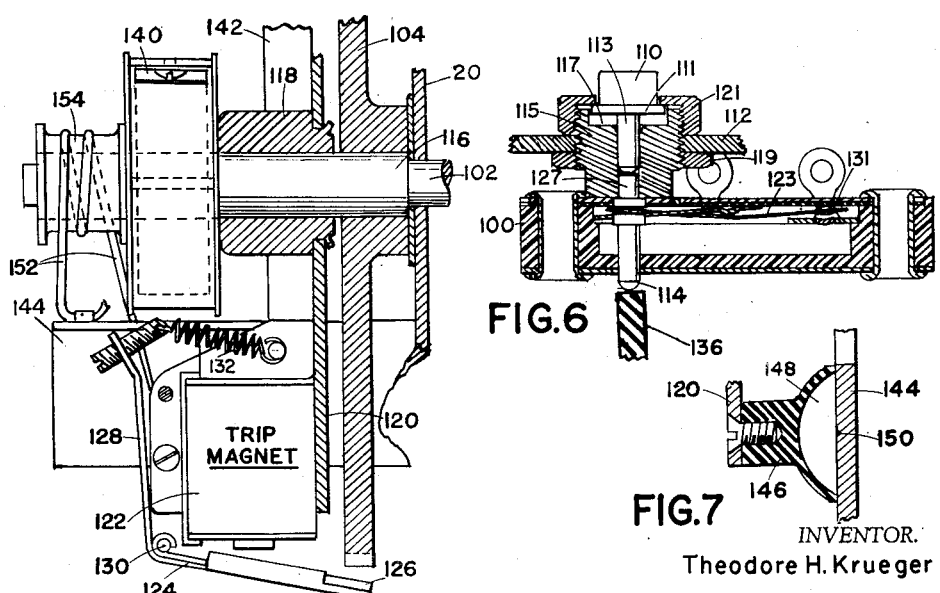

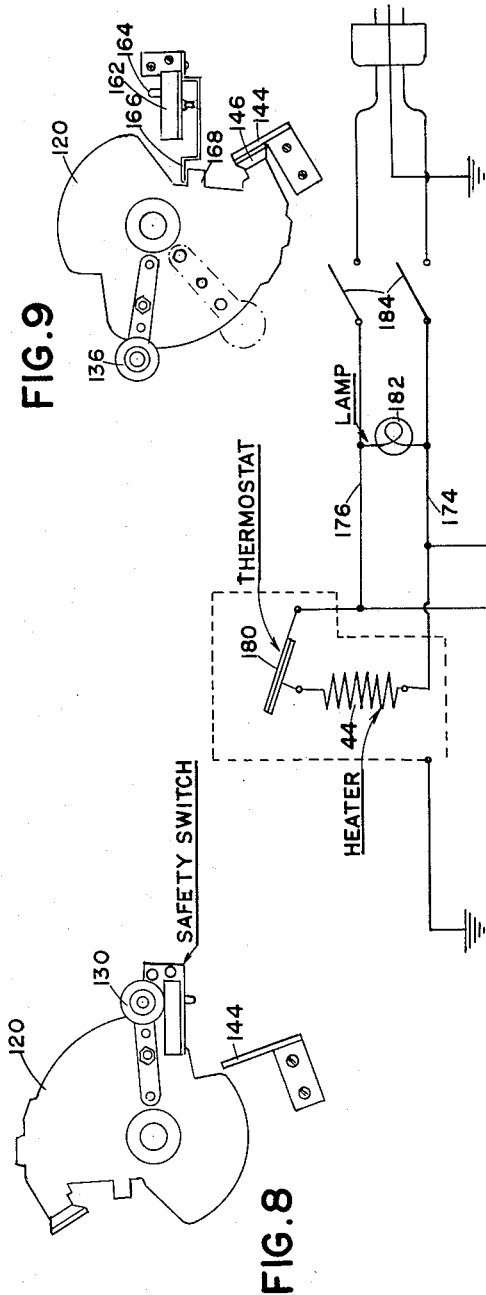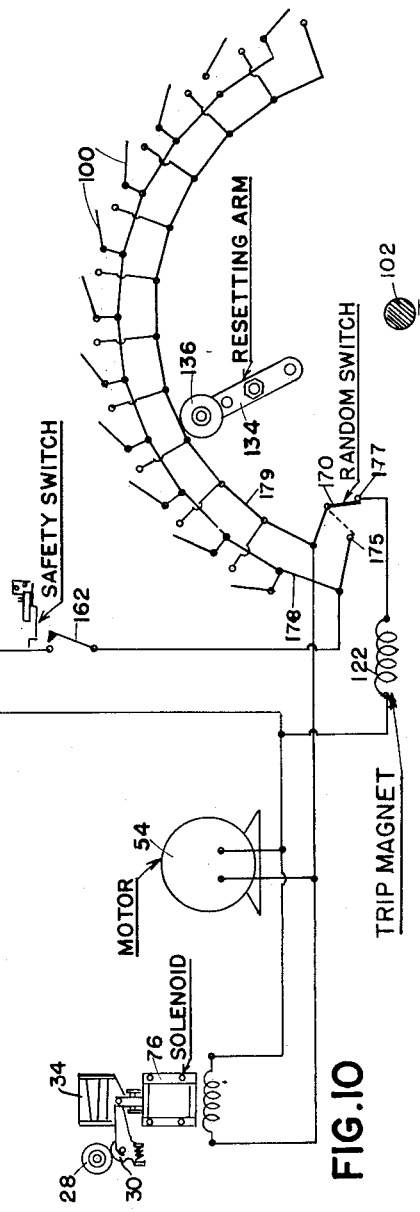

United States Patent Office 2,994,464
Patented Aug. 1, 1961

2,994,464
PUSH BUTTON TAPE DISPENSER
Theodore H. Krueger, % Better Packages, Incorporated, Stratford, Conn.
Filed Mar. 25, 1959, Ser. No. 801,867
15 Claims. (Cl. 226—135)

This invention relates to devices for dispensing tape in measured lengths, particularly gummed package sealing tape, although it may be used wherever selected definite lengths of a tape or strip are to be dispensed.

In accordance with the present invention, power-driven tape feeding instrumentalities are used and a control mechanism is provided having a series of switches which may be selectively actuated, each causing a corresponding specific length of tape to be fed from the dispenser. Various dispensers have heretofore been proposed for accomplishing this general result, but they have been subject to numerous disadvantages such as mechanical complication, cost, slowness of operation, inaccuracy, unreliability and difficulty of maintenance in operative condition. A mechanical control mechanism is disclosed in my Patent 1,960,945, May 29, 1934, this mechanism being subject to one or more of the objections above noted. An electronic control mechanism, which is very effective but which involves some electrical complexity, is disclosed in patent to Beckman & Dodds No. 2,408,363, October 1, 1946. This last named patent included the use of a vacuum tube and more or less complicated electrical apparatus. Other attempts to provide a satisfactory tape dispenser of the character under consideration have involved what is in effect an electrical revolution counter for counting the number of rotations of a tape feed wheel, stepping relays and other complicated electrical devices; and others have involved mechanical connections requiring precision manufacture, all being subject to in more or less degree the objections noted above.

The present invention avoids the complications of previous measuring dispensers and provides a construction which is of great simplicity both electrically and mechanically, is simple and inexpensive to manufacture and highly reliable in operation. In general the present machine provides a plurality of control circuits for the motor-actuated tape feeding rolls in which a plurality of individual reset switches are utilized, each switch controlling the feed of a specified length of tape. A simple mechanical reset element moving with the tape feed at an appropriate speed of reduction is provided which will reset whatever switch has been closed and stop the feed when the length of tape corresponding with that switch has been fed. This construction obviates the need for vacuum tubes or other electronic apparatus, counting or stepping relays, mechanical interlocking connections or linkages for controlling the feed, or any devices depending upon precision manufacture to secure reliable operation.

The prime object of the invention may therefore be stated to be the provision of a tape feeding mechanism and control involving a minimum number of parts which can be constructed at low cost and which will be reliable and certain in operation and which will not require frequent or difficult repairs, and which will render rapid and accurate service over long periods of use.

Specific objects and advantages of the invention will appear in the course of the following description of one preferred example thereof. In the accompanying drawings:

FIG. 4 is a vertical transverse sectional view of the machine;

FIG. 5 is a fragmentary transverse vertical sectional view showing the trip magnet and clutch in unclutched position;

FIG. 6 is a transverse sectional view of one of the switches mounted on the housing;

FIG. 7 is a sectional view of the bumper suction cup;

FIGS. 8 and 9 are diagrammatic views showing different positions of the reset sector and safety switch; and FIG. 10 is a schematic wiring diagram of the machine.

Figure 2:
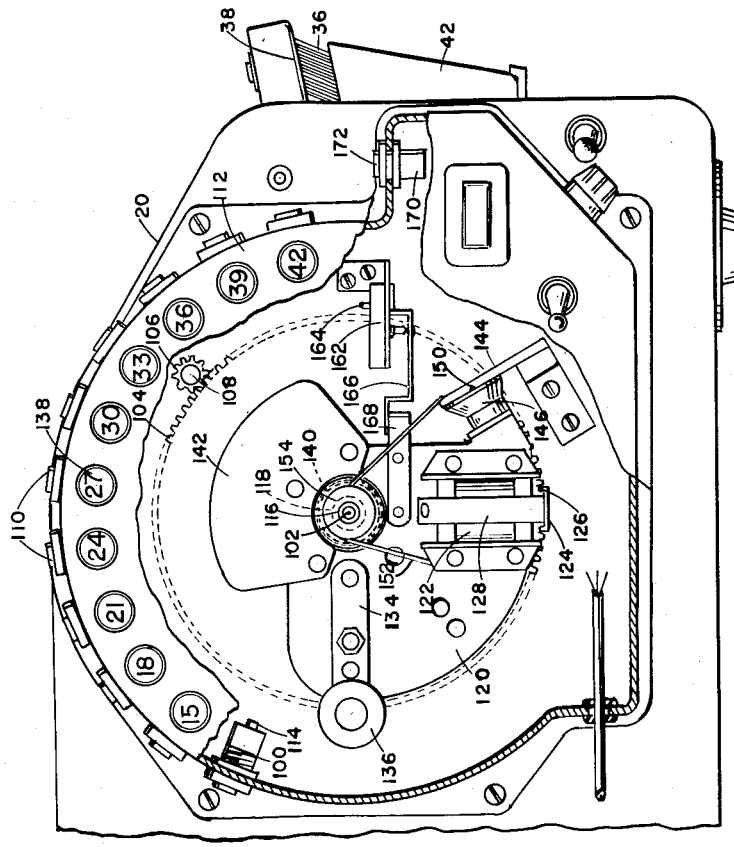
FIG. 2 is a view in elevation of the side of the machine carrying the strip length measuring means, part of the housing being broken away.
Figure 1:
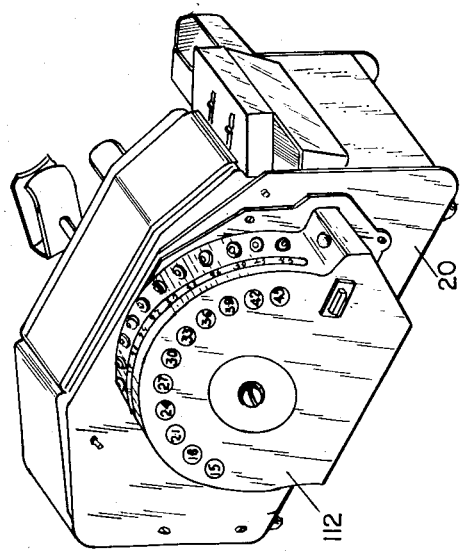
FIGURE 1 is a perspective view showing a machine embodying a preferred form of the invention.
Figure 3:
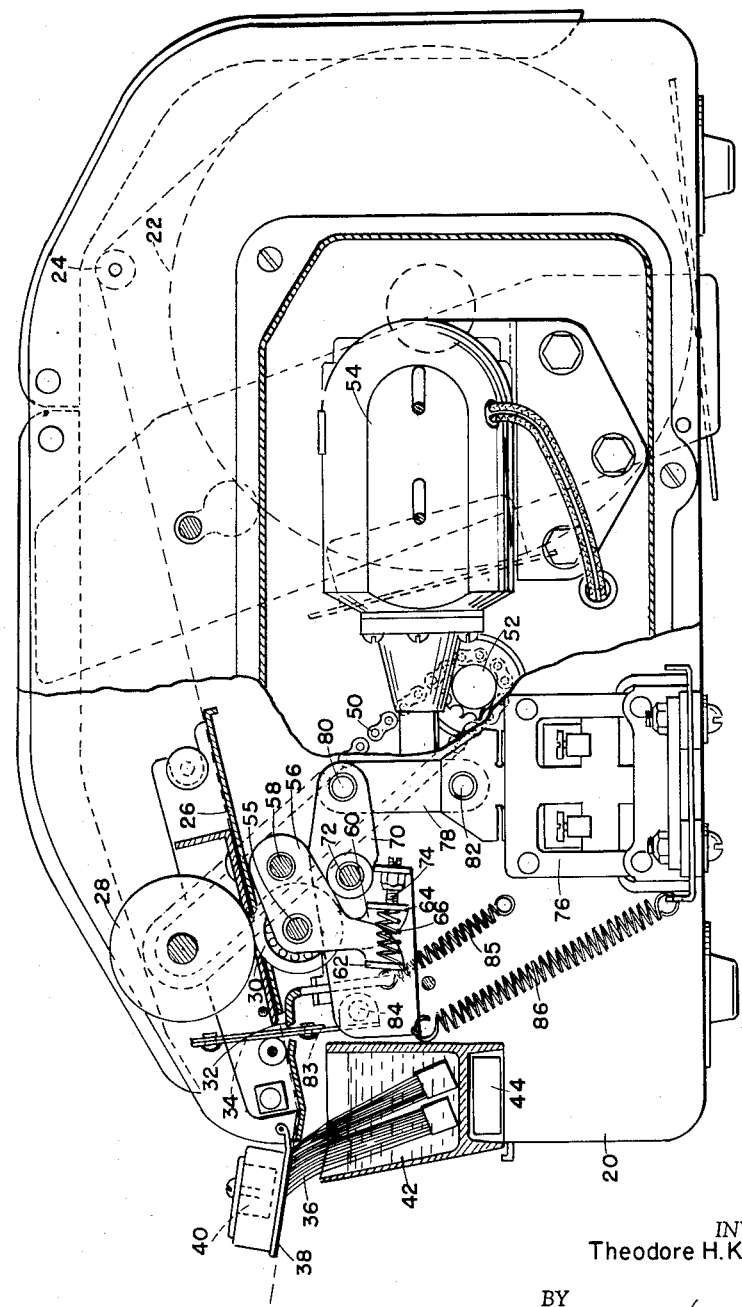
FIG. 3 is a view of the opposite side of the machine partly in elevation and partly in longitudinal section.

Referring to the drawings in detail, and particularly to FIGURE 3, the machine has a casing 20 which may be of any suitable design and which has a space for a roll of tape 22 indicated by dotted lines. The tape is drawn from the roll over a guide roller 24 and then passes over a table 26 across which it is fed in any suitable manner, as by the driven feed roll 28 and pressure or idler roll 30. The tape is then fed over the fixed knife blade 32 with which cooperates a movable knife blade 34. Before the tape is severed it is pushed through the moistening couple comprising the moistening brush 36 and the hinged gravity-actuated pressure plate 38 which may be provided with an adjustable weight 40 by which the amount of pressure pressing the tape against the brush may be adjusted. The brush 36 is mounted in a water reservoir 42 preferably provided with an electric heater 44 and with a water supply bottle 46 (FIG. 4). These parts may be of conventional construction. Of course the moistening couple would be omitted if the tape were of a character not to require moistening before use.

In the construction shown the feed roll 28 is driven by a chain 50 from a sprocket 52 driven by a worm and gear from a motor 54. The disclosed method of mounting the motor and driving the feed roll by the chain drive is very compact and rugged in construction. The pressure or idler roll 30 is shown mounted on a stud 55 carried by an idler bracket 56 pivoted on a shaft 58. Mounted on the stud 55 of the idler roll is an idler arm 60. The idler bracket and the idler arm have laterally bent flanges 62 and 64 between which is a compression spring 66. The pressure or idler roll is actuated by means of a yoke 70 which is pivoted on the shaft 72 and which carries a screw 74 engaging the flange 64 on the idler arm 60. When the yoke is actuated to apply pressure to the idler arm, a yielding pressure is applied through the spring 66 to the idler bracket, and consequently the roll 30 is caused to move up so as to grip the tape between it and the feed roll 28. The amount of pressure applied through the spring may be adjusted by means of the screw 74.

The yoke 70 is actuated from a solenoid 76 which is connected to the yoke by link 78 and pivots 80 and 82. The yoke 70 may also be used as a means of actuating the movable cutter blade 34 which is carried by cutter frame 83 of usual construction pivoted to the yoke at 84. The yoke is shown as normally retracted by a tension spring 86. When the solenoid is energizing the front of the yoke is swung upward so as to cause the tape to be gripped and fed. When the circuit through the solenoid is broken, the feed of the tape stops and the yoke and cutter are drawn down by the spring 85 so as to sever the tape. The movable cutter remains down until the circuit through the solenoid is closed, whereupon the cutter will be raised out of the path of the tape at the same time the feed is started. As the cutter remains in down position when feeding is stopped, it will prevent any possible overfeed of the tape towards the moistening couple. The cutting is also done by the spring action, which can be easily regulated and which is less violent than would be the operation of the cutter in cutting direction by the solenoid. The detailed cutting and feeding mechanism described is an excellent construction but may be varied to suit the type of tape being fed; and the measuring devices about to be described may be utilized with other feeding mechanisms.

Measuring control

Control of the delivery of the tape in desired lengths is accomplished by the means of a plurality of resettable switches mounted in a linear series with respect to a reciprocable resetting member. By the mounting of the switches in linear series is meant the location of the switches one after the other so that they will be engaged seriatim by a reciprocating member or members. The switches may be mounted in a straight line or staggered or in a curved arrangement depending on the path of the reciprocating member or members. In the illustrated embodiment of the invention the switches 100 are mounted in an arc concentric with the fixed shaft 102 carrying the pivot stud 116 on which is freely mounted a large gear 104 driven by a pinion 106 fixed to the shaft 108 carrying the motor driven feed roll 28. The switches are arranged to be selectively closed by push buttons 110 carried by the arcuate wall of the control housing or key drum 112 at one side of the main casing 20. These switches may be of any suitable resettable type in which the switch will stay in whatever condition it is set either open or closed, until reset. When a switch is actuated by pushing down on its push button 110, a resetting pin 114 is pushed down from the underside of the switch. A suitable construction of push button switch is shown in FIGURE 6 and it comprises a housing in which is a movable member comprising a two position leaf spring 123 of known construction carrying a contact movable into engagement with a fixed contact 131 in the switch. Fixed to the switch top is a threaded stud 115 which carries the push button 110. This is retained in position in any suitable manner as by being provided with a flange 111 loosely retained in a recess 117 in the stud 115 by a flanged nut 121. The switch may be readily mounted in position by passing the stud 115 through a hole in the wall of housing 112 and clamping it to the wall between the flanged nut 121 and a counter nut 119. The stem 113 of the push button actuates the contact spring 123 through an insulating stud 127.

When any one of the push buttons 110 is pressed, the driving motor 54 will be started, the solenoid 76 will be energized, and tape feed will be started as already described. The feed will continue until the switch is opened by pushing up of the pin 114, whereupon feed will stop and tape will be severed. When the tape feed starts it will be seen that the feed roll 28, shaft 108 and pinion 106 will be rotated, the latter rotating the gear 104 at a much reduced speed. The gear 104 is mounted to rotate freely on the pivot stud 116 on which is also mounted to rotate freely a hub 118 carrying a plate or sector 120. This sector also carries a trip magnet 122 and a clutch plate 124 having a tooth 126 adapted to be moved into engagement between two teeth of the gear 104 when the trip magnet is energized. The clutch plate 124 is mounted on a bell crank 128 pivoted at 130. When the trip magnet is de-energized the clutch plate 124 is held in retracted position by the spring 132 connected with the bell crank as shown in FIGURE 5. The sector 120 has fixed to it an arm 134 carrying a resetting wiper member 136 which is preferably in the form of a roller of some elastic material such as a durable and firm synthetic sponge rubber compound which contacts with the pin 114 of any one of the switches 100 which may have been closed by the depression of its push button 110. When the push button is depressed and the solenoid 76 energized so as to start the feeding of tape, the trip magnet 122 is also actuated so as to draw the tooth 126 on the clutch member into engagement with the gear 104. Accordingly the sector 120 will start with the rotation of the gear 104 which will move the roller 136 along until it contacts the pin 114 of the switch which has been depressed. This will push out the pin, break the circuit and stop the feed of tape.

As the push buttons are arranged in linear series, each will correspond with a definite length of tape. It is therefore merely necessary to designate the push buttons in a suitable manner as by the numbers 138 to indicate the corresponding length of tape, and the operator, to receive that length of tape, will merely push the appropriate button. After the measured length of tape has been delivered and the switch reset by engagement of the roller 136, the circuit through the trip magnet 122 is broken and the clutch member therefore disengaged from the gear 104. The sector is then returned to its initial position by suitable means such as the spiral clock type spring 140. The action of the spring is preferably modified and supplemented by use of a counterweight 142 fixed to the sector. This is arranged so that it will tend to assist or not oppose the spring action when short lengths of tape have been fed and the tension of the spring is therefore relatively low, whereas when long lengths of tape have been fed and the spring is more highly tensioned, it will have to overcome the action of the counterweight which will prevent the too violent return of the sector.

The sector is stopped in its zero position by means of a fixed abutment 144 which is engaged by a movable abutment on the sector. A cushioning means is inserted between the abutments, it being shown as comprising a yielding bumper 146 on the sector. As the sector returns against the abutment with considerable violence, and as recoil or bouncing would be objectionable, the construction of the bumper is of considerable importance. In the construction illustrated, the yielding bumper 146 takes the form of a rubber vacuum cup having a depression 148 therein (FIG. 7) from which the air is expelled when the cup hits the abutment, thereby causing the cup momentarily to adhere thereto so as to prevent bouncing. It is desirable to have a slight leakage into the cup and this may be accomplished by providing a leak-hole or by cutting a very small groove 150 in the face of the abutment. Such leakage will not interfere with the instantaneous action of the vacuum cup when it strikes the abutment and adheres thereto, but will quickly permit breaking of the vacuum so as not to interfere with the quick movement of the sector on the next actuation of the machine.

As the length of tape delivered depends on the distance traveled by the sector and reset roller 136 before the roller reaches and resets the switch which has been closed, this length may be modified by changing the position in which the roller is mounted on the sector. Thus if the roller 136 and its arm 134 are secured to the sector in the position shown in dotted lines in FIGURE 9 instead of in the position shown in full lines, the sector will travel further before any particular switch which may have been actuated is reset. Accordingly each tape length delivered will be longer by an increment, say nine inches, determined by the new position of the roller. A very simple means for changing the tape lengths to be delivered by the machine is thus provided.

A convenient arrangement is provided for leading current to the trip magnet, this being shown as a flexible and extensible insulated conductor 152 fixed at one end to a connection on a stationary part such as the abutment bracket 144 and at the other end to the movable magnet 122. A loop of the conductor is formed around a spool 154 of insulating material mounted concentrically with the pivot stud 116 about which the sector and trip magnet turn. This provides for an electrical connection to the magnet which will last indefinitely notwithstanding the incessant reciprocation of the magnet during use of the machine. At the same time loose and dangling wires are eliminated.

In order to prevent over-travel if for any reason the contact roller 136 should fail to stop the machine by pushing out and resetting any switch which might have been pressed, a safety switch 162 is provided which is also preferably in the form of a resettable switch. This switch is mounted in a position beyond the last push button switch so that if the sector over-travels, the roller 136 will come directly down upon the pin 164 of the switch 162 and positively actuate the same so as to break the circuit and stop the machine. If this action has taken place, the switch 162 will be restored to open position by a spring arm 166 which will be engaged by a lug 168 on the sector when it returns to zero position.

What may be termed a random switch 170 is also preferably provided, this switch not being a resettable switch but a two way switch which may be held in position to close the circuit through the motor and solenoid 76 as long as desired by pressure of the finger of the operator on a random button 172. Delivery of tape will continue until the operator ceases to press the button.

The electrical system of the described machine is of extreme simplicity as shown by the wiring diagram, FIGURE 10. Two lead wires 174, 176 are connected to the line current. The wire 176 leads directly to the motor 54 and solenoid 76. The other lead contains the normally closed safety switch 162 and is connected to the contact 175 of the random switch 170. When the random switch is closed against this contact as shown in dotted lines in FIG. 10 the circuit is closed directly through the motor and solenoid and tape feed continues until the random switch button is released. The switch is then moved by spring pressure to close against the contact 177, its normal position. This brings into the circuit the trip magnet 122 and the parallel leads 178, 179 connected to the push button switches 100, closing of any one of which will start the feed of tape. Also shown in the wiring diagram are the heater coil 44 and the heater control thermostat 180, the signal lamp 182 and the line switch 184.

It will be seen that the electrical elements for controlling the delivery of measured lengths of tape are of the simplest character, comprising one motor, one solenoid which controls both tape feed and cutting, one trip or clutch magnet, and the series of resettable push button switches. No relays or holding circuits or other special electrical devices are needed. The closing of the circuit through the solenoid merely lifts the cutter and holds it in position ready to cut until the circuit is broken whereupon the cutter is released and actuated by its spring. The special mechanical elements required include only the sector and means for driving it and the switch resetting arm and roller mounted on the sector. No mechanical interlocking devices requiring great precision of manufacture or adjustment are used.

I have described what I believe to be the best embodiment of my invention. I do not wish, however, to be confined to the specific example shown but what I desire to cover by Letters Patent is set forth in the appended claims.

1. In a tape dispenser, means for feeding tape, electrical circuit means for starting and stopping the feeding means, a plurality of manually operable electrical reset switches mounted in linear series and connected in said circuit means, operation of any one of which will change the condition of said circuit means for starting the tape feed, a resetting member movable longitudinally of said series of switches and engageable with any switch in the series which has been manually set, to reset said switch so as to change the condition of said circuit means to stop the tape feed, and means for driving said movable resetting member in predetermined ratio to the length of tape fed.

2. A tape dispenser as claimed in claim 1 in which the switch resetting member is movable in a reciprocating path, and means for returning said resetting member to its starting position as soon as it has reset a manually actuated switch.

3. A tape dispenser as claimed in claim 2 in which there is a safety switch at the end of forward travel of the resetting member, located in the path of said member and connected in said circuit means for stopping the tape feeding means.

4. A tape dispenser as claimed in claim 3 in which the switch resetting member includes a reciprocating sector having a contact roller thereon for wiping resetting contact with the series of switches and positive engagement with the safety switch.

5. A tape dispenser as claimed in claim 3 in which the safety switch is a resettable switch, the resetting member having a part for operative engagement with said safety switch to reset the same upon the return of the resetting member to its initial position.

6. A tape dispenser as claimed in claim 1, in which said series of reset switches is mounted in an arc, said resetting member being mounted to move in a concentric arcuate path.

7. A tape dispenser a claimed in claim 6 in which the means for driving the resetting member includes a gear mounted to rotate about a shaft concentric with the arc in which the switches are mounted, means for connecting said gear with the tape feeding means to cause the gear to rotate whenever the tape feeding means are actuated, clutch means for temporarily connecting said resetting member to said gear, and means for reciprocating said resetting member to its initial position when disconnected from said gear.

8. A tape dispenser as claimed in claim 7 in which the means for temporarily connecting the resetting member to the gear comprises a movable clutch member having a tooth adapted to engage with teeth on said gear and electromagnetic means for actuating said clutch member.

9. A tape dispenser as claimed in claim 7 in which there is an electromagnet on the resetting member for actuating said clutch means and a flexible conductor for carrying current to said magnet anchored at one end to a fixed terminal and at the other end to said magnet, an intermediate portion of said flexible conductor being looped closely around a spool mounted concentrically with the center of motion of said resetting member.

10. A tape dispenser as claimed in claim 6 in which the switch resetting member is provided with a spring for returning it to initial position and with bumper means for stopping it in that position, said bumper means including an elastic vacuum cup seating against an abutment surface and means for providing slow leakage into said cup when seated.

11. In a tape dispenser, tape feeding rolls, an electric motor for driving the same, a plurality of electrical reset switches arranged in linear series, an electric circuit connecting said motor, switches and a source of power, said switches being connected in said circuit in parallel so that closing any one of said switches will close said circuit and start the feed of tape, and opening any switch will stop the feed of tape, push buttons for closing said switches, a reciprocating switch resetting member movable along the series of switches for opening any previously closed switch, and means for advancing said resetting member in proportion to the length of tape fed.

12. A tape dispenser as claimed in claim 11 in which the means for advancing the resetting member includes clutch means movable with the resetting member and temporarily engageable with a drive member operatively connected with the motor for advancing the resetting member, and an electromagnet for operating said clutch means, said magnet being included in said electric circuit.

13. A tape dispenser as claimed in claim 11 having a two-way random switch for by-passing said series of switches and closing said circuit to cause feeding of tape so long as said random switch is actuated.

14. In a tape dispenser, means for feeding tape, electrical circuit means for starting and stopping the feeding means, a control housing, a plurality of electrical reset switches mounted in linear series on a wall of said housing and connected in said circuit means, push buttons on the outside of said housing for manually closing said switches to start the feeding means, said switches having contact elements projected inwardly of the housing when said push buttons are pushed, switch resetting means in the housing engageable with the contact element of any switch which has been manually pressed in to push said contact element out and open said switch and stop the feeding means, and means for driving said switch resetting means in predetermined ratio to the length of tape fed.

15. A tape dispenser as clamed in claim 14 in which each reset switch comprises a casing containing a movable contact element and having a stud fixed to its outer surface projecting through a hole in the housing wall and clamped to said wall to hold the switch inside of said wall, and a push button mounted on said stud and having a stem extending through said stud into operative engagement with actuating means for said movable contact element.

References Cited in the file of this patent
UNITED STATES PATENTS

| | | |
|---|---|---|
| 2,767,981 | Hempel | Oct. 23, 1956 |
| 2,785,748 | Von Stoesser | Mar. 19, 1957 |
| 2,800,178 | Taylor | July 23, 1957 |
| 2,801,848 | Taylor | Aug. 6, 1957 |
| 2,892,500 | Le Baron | June 30, 1959 |